United States Patent
Cobianco et al.

(10) Patent No.: US 6,495,493 B1
(45) Date of Patent: Dec. 17, 2002

(54) NON-DAMAGING DRILLING FLUIDS

(75) Inventors: Sandra Cobianco, Fara Geva d'Adda (IT); Martin Bartosek, Legnano (IT); Alberto Guarneri, Casalbuttano (IT)

(73) Assignees: ENI S.p.A., Rome (IT); Enitechnologie S.p.A., San Donato Milanese (IT)

( * ) Notice: Subject to any disclaimer, the term of this patent is extended or adjusted under 35 U.S.C. 154(b) by 102 days.

(21) Appl. No.: 09/721,647

(22) Filed: Nov. 27, 2000

(30) Foreign Application Priority Data

Nov. 26, 1999 (IT) .......................... MI99A2473

(51) Int. Cl.$^7$ ................................. C09K 7/02
(52) U.S. Cl. .................... 507/110; 507/111; 507/112
(58) Field of Search ................ 507/110, 111, 507/112

(56) References Cited

U.S. PATENT DOCUMENTS

| | | | |
|---|---|---|---|
| 4,428,843 A | | 1/1984 | Cowan et al. |
| 4,822,500 A | * | 4/1989 | Dobson, Jr. et al. ........ 507/111 |
| 5,362,713 A | * | 11/1994 | Westland et al. ........... 507/110 |
| 5,804,535 A | * | 9/1998 | Dobson et al. ............. 507/111 |
| 5,951,910 A | * | 9/1999 | Skaggs et al. .............. 507/112 |
| 6,133,203 A | * | 10/2000 | Estes et al. ................. 507/110 |

FOREIGN PATENT DOCUMENTS

| | | |
|---|---|---|
| EP | 0 691 454 | 1/1996 |
| WO | WO 92/22621 | 12/1992 |

OTHER PUBLICATIONS

International Commercial Services, XP–002162184, "Mud Speciality Products, Fiber Lock", pp. 1–7, Mar. 6, 2001.
H.C.H. Darley, et al., Gulf Publishing Company, XP–002162185, pp. 563–576, "Composition and Properties of Drilling and Completion Fluids", 1988.

* cited by examiner

Primary Examiner—Philip Tucker
(74) Attorney, Agent, or Firm—Oblon, Spivak, McClelland, Maier & Neustadt, P.C.

(57) ABSTRACT

Water-based drilling fluid comprising:
(a) water,
(b) at least one biopolymer of the polysaccharide type,
(c) at least one filtrate reducer selected from starches with different cross-linking degrees in presence of cellulose microfibers,
(d) optionally a hydrosoluble polymeric surface-active agent having an HLB from 10 to 16, preferably from 11 to 14.

17 Claims, No Drawings

NON-DAMAGING DRILLING FLUIDS

The present invention relates to non-damaging drilling fluids, essentially solid-free, whose main constituents are (a) a biopolymer of the polysaccharide type, (b) a filtrate reducer essentially consisting of starch, and its derivatives, in presence of cellulose microfibers.

The exploitation of complex, fractured and/or depleted production zones, and the application of new drilling techniques such as open-hole, slim-hole drilling etc., require the development of new drilling fluids (Drill-In-Fluids) which do not damage the reservoirs in order not to reduce the productive capacity of the wells. For this purpose, the polymeric additives and possible particles contained in the fluid and also those produced as a result of the drilling, must be prevented from penetrating into the formation and thus irreversibly blocking the rock pores and jeopardizing the productivity. Drill-In-Fluids prevent damage to the reservoir by the formation on its surface of a thin filter cake which is impermeable and can be easily removed when the well is put into production or by the action of enzymes or acids.

Various formulations have been studied over the years, that are capable of producing a filter cake which sticks firmly to the well walls and is sufficiently thin as to avoid operative problems, such as "stuck pipe". Furthermore the permeability of the filter cake must be so reduced as to minimize fluid loss due to filtration of the drilling fluid through the rock formation.

Patent literature describes numerous formulations capable of solving the above problems.

For example, EP-A-691,454 describes water-based drilling fluids, whose main components are a non-ionic biopolymer of the polysaccharide type, a polymerized starch and calcium carbonate particles having a specific particle-size distribution.

The composition described in EP-A-691,454 however has the disadvantage that the calcium carbonate returns to the surface together with the cuttings, thus requiring a further addition of the carbonate particles to the fluid which is re-circulated. The filter cake formed by calcium carbonate, moreover, is too thick.

A drilling fluid composition has now been found, which overcomes the drawbacks specified above.

In accordance with this, the present invention relates to a water-based drilling fluid comprising:

(a) water,
(b) at least one biopolymer of the polysaccharide type,
(c) at least one filtrate reducer selected from (c1) starches with different cross-linking degrees in presence of cellulose microfibers (c2),
(d) optionally a hydrosoluble polymeric surface-active agent having an HLB ranging from 10 to 16, preferably from 11 to 14.

In the preferred embodiment, the biopolymer (b) is present in the drilling fluid in a concentration ranging from 2 to 10 grams/liter, preferably from 4 to 7 grams/liter; the cross-linked starch (c1) in a concentration of 10 to 30 grams/liter, preferably from 12 to 20 grams/liter; the cellulose microfibers in a quantity ranging from 10 to 30 grams/liter, preferably from 12 to 20 grams/liter.

The biopolymers of the polysaccharide type (b) are hydrosoluble polymers produced by bacteria or fungi. Their function is to increase the viscosity of the fluid in order to keep the filtrate reducers and possible drilled solids suspended both during the drilling period and during possible stop in the fluid circulation. They may be of the ionic or non-ionic type. Examples of non-ionic biopolymers are scleroglucan and welan gum. A commercial product belonging to this group is Actigum® CS 6, produced by SKW Trostberg, described as a branched homopolysaccharide produced by a fungus of the Sclerotium type by means of an aerobic fermentation process. The main chain of scleroglucan consists of residues of the β-D-glucopyranosyl type with bonds (1–3) whereas the branchings consist of D-glucopyranosyl residues with β bonds (1–6) every three glucoside groups.

Another non-ionic biopolymer is welan gum produced by the Alcaligenes species. This is a heteropolysaccharide similar to scleroglucan but with residues of the α-L-rhamnopyranosyl or α-L-mannopyranosyl type.

A further example of the biopolymer (b) is xanthan gum. This is an anionic branched heteropolysaccharide produced by the bacterium Xanthomonas campestris, characterized by a main chain consisting of D-glucopyranoside residues with lateral chains consisting of piruvate and acetate groups.

Another main component of the composition of the present invention is the filtrate reducer (c), selected from starches and their derivatives (c1). The above starches are cross-linked by means of bifunctional reagents such as phosphates or epichlorohydrin, and are therefore insoluble in water. The starches however are compatible with the biopolymers (b) and their purpose is to form a homogeneous and impermeable filter cake on the rock surface. A non-limiting example of cross-linked starch which is commercially available is that produced by Chemstar®.

Another component of the filtrate reducer consists of cross-linked colloidal cellulose fibers (c2), produced by micro-organisms, of the Acetobacter type, under aerobic conditions. These products are insoluble in water and have a high surface area with a behaviour in aqueous phase which is totally insensitive to high temperatures, pH, salinity and shear. The preparation of these cellulose microfibers is known and described in various patent documents, for example U.S. Pat. No. 5,079,162 and U.S. Pat. No. 5,144,021. Combined with starch and biopolymer, the cellulose fibers enable the formation of a filter cake having an extremely low permeability and which can be easily removed by the simple put into production of the well.

An optional component of the composition of the present invention (d) is a hydrosoluble polymeric surface-active agent having an HLB ranging from 10 to 16, preferably from 11 to 14. A non-limiting example of a commercially available non-ionic surface-active agent consists of alkyl-polyglucosides.

As is known to experts in the field, the composition of the present invention may contain other additives, such as biocides, lubricants, clay inhibitors, pH regulators.

The density of the drilling fluid, moreover, may be increased by the addition of saturated solutions of sodium, potassium, calcium chloride, or sodium, potassium or cesium formates.

The water-based drilling fluid of the present invention is substantially solid-free and has various advantages with respect to fluids containing solids. In fact:

1) the viscosity of the drilling fluid of the present invention at high shear values is sufficiently low to guarantee low pressure drops during drilling, above all in the case of slim-hole drilling (i.e. a small drilling diameter often used to reduce costs);
2) the gel and viscosity values at low shear values are sufficiently high to keep the cuttings in suspension when the fluid circulation is stopped, thus avoiding the formation of deposits;
3) the absence of calcium carbonate particles allows an easier recycling of the drilling fluid after passing through the surface equipment (shale shaker) to recover the cuttings; in fact, it is not necessary to reintegrate the calcium carbonate;

4) the formulation of the present invention is particularly suitable for formations with a low/medium permeability (up to 500 mD) and does not require an accurate knowledge of the formation permeability, as is the case, on the contrary, for fluids which use solids, whose particle-size distribution greatly depends on the reservoir permeability.

The drilling of the non-productive zone of the well can be effected initially also using the conventional drilling fluids containing bentonite and/or barite. Near the productive zone, these fluids are then substituted with those of the present invention, which are recirculated in order to remove the conventional fluid, in particular bentonite or barite or other potentially harmful additives. At this point the drilling of the productive zone can be restarted with circulation of the above fluid, thus avoiding damage to the reservoir.

The composition of the drilling fluid of the present invention is prepared by the simple mixing of the components. It is preferable, however, for the mixing to be carried out by the successive addition of the single components, care being taken that each single component is completely mixed before the addition of the subsequent one.

A further object of the present invention relates to a process for drilling oil and/or gas wells by means of water-based drilling fluids, characterized in that the drilling fluid comprises:

(a) water, (b) at least one biopolymer of the polysaccharide type, (c) at least one filtrate reducer selected from (c1) starches with different cross-linking degrees in presence of cellulose microfibers (c2), (e) optionally a hydrosoluble polymeric surface-active agent having an HLB ranging from 10 to 16, preferably from 11 to 14.

The following examples are provided for a better understanding of the present invention.

EXAMPLES

Preparation of the Formulations

Example 1

Preparation of a Fluid Based on Scleroglucan, Starch and Cellulose Microfiber

The formulation was prepared according to the following procedure:

6 g of Biovis® (scleroglucan) were dissolved in 1 liter of deionized water using a Silverson stirrer for 30 minutes. 16 g of EXSTAR® starch and 16 g of cellulose microfibers were then added under stirring. At the end of the preparation the fluid was brought to pH 10 with a solution of NaOH 1N, characterized from a rheological point of view by means of FANN 35 according to the API B-13 procedure of September 1997, and subsequently subjected to filtration tests under static conditions according to the following procedure.

200 ml of fluid were charged into an API modified filtration cell, in which the filter paper was substituted by an aloxite disk having a thickness of 0.5 cm, a diameter of 5.08 cm, a permeability of 750 mD and a porosity of 5 $\mu$m. A pressure of 7 bars was then applied to the cell and the filtrate recovered was measured after 10 minutes.

The evaluation of the thermal stability of the formulation was evaluated by comparing the rheological data before (BHR) and after (AHR) heating to 90° C. for 16 h and 17 rpm (hot rolling test). The data are indicated in Table 1.

Comparative Example 2

Preparation of a Fluid Based on Scleroglucan, Starch and $CaCO_3$ 118 grams of Avafulflow®, a mixture containing scleroglucan, starch and calcium carbonate particles, are dissolved in 900 ml of deionized water using a Silverson stirrer for 15 minutes. 90 grams of calcium carbonate AVACARB® with a known particle-size distribution were then added, under stirring, to the dispersion. At the end of the preparation, the fluid is brought to pH 10 with a solution of NaOH 1N. The characterization data are provided in Table 1.

Test for Evaluating the Formation Damage

The evaluation of the formation damage due to the drilling fluid during the drilling phase was performed using an experimental apparatus employed for fluid flooding into porous media (rock cores). The system consists of a Hassler cell pressurized with water in which a rock core having a diameter of 5.08 cm and a length of 7.3 cm contained in a rubber sleeve, is inserted. A metal ring having a thickness of 1 centimeter, is inserted at the inlet end of the core to allow the filter cake to grow on the core surface during the injecting of the drilling mud. The injection of the fluid is performed using a cylinder equipped with a floating piston whereas the quantity of fluids which filtrates through the core is monitored by means of an electronic balance connected to the data acquisition system. After flooding with an aqueous solution of KCl 3%, the final permeability is measured and the damage is evaluated as a ratio between the final and initial permeability. The filtration test has a duration of 4 h, the maximum differential pressure applied during the fluid injection is 100 bars and the maximum temperature is 200° C. The apparatus allows an accurate characterization of the initial and final permeability of the core, the monitoring of the filter cake formation and the evaluation of the residual damage of the core after the removal of the filter cake.

Example 1 Bis

Core Flooding Test of the Fluid Prepared in Example 1#

The formation damage test of the fluid #1 was carried out according to the procedure described above with a Portland type limestone core having an initial permeability to water of 18.4 mD. The test was carried out with a differential pressure of 10 bars and at a temperature of 80° C. The return permeability, i.e. the ratio between the final permeability and the initial permeability to brine, was 100% (no damage of the core).

Example 2 Bis

Comparative Core Flooding Test of the Fluid Prepared in Example 2#

The formation damage test of the fluid #2 was carried out according to the procedure described above with a Portland type limestone core having an initial permeability to water of 38 mD. The test was performed with a differential pressure of 10 bars and at a temperature of 80° C. The return permeability, i.e. the ratio between the final permeability and the initial permeability to brine, was 66% (the core was damaged).

TABLE 1

Formulation composition for drilling fluids

| Components | Example #1 | Example #2 (comparative) |
|---|---|---|
| Water, ml | 1000 | 900 |
| BIOVIS (Scleroglucan), g | 6 | — |
| N-VIS (Xanthan gum), g | — | — |
| EXSTAR (Starch), g | 16 | — |
| N-VIS HB (crosslinked cellulose microfibers), g | 16 | — |
| AVAFULFLO (mixture scleroglucan, starch, $CaCO_3$), g | — | 118 |
| $CaCO_3$, g | — | 90 |
| density | 1.06 | 1.1 |
| pH | 10.2 | 10.1 |
| Rheological characteristics | | |

| | Example #1 | | Example #2 (comparative) | |
|---|---|---|---|---|
| | BHR | AHR (90° C., 16 h) | BHR | pAHR (90° C., 16 h) |
| Reading at 600 rpm, Pa | 41 | 60 | 52 | 48 |
| Reading at 300 rpm, Pa | 31 | 44 | 37 | 34 |
| Reading at 200 rpm, Pa | 26 | 38 | 31 | 28 |
| Reading at 100 rpm, Pa | 20 | 29 | 24 | 21 |
| Reading at 6 rpm, Pa | 8 | 13 | 11 | 6 |
| Reading at 3 rpm, Pa | 7 | 12 | 10 | 4 |
| Gel 10"/10', g/100 | 4/6.5 | 7/12 | 5.5/7 | 2.5/2.5 |
| PV, cP | 10 | 16 | 15 | 14 |
| YP, g/100 $cm^2$ | 10.5 | 14 | 11 | 10 |
| $\tau_0$, k, n (Herschel-Burkley model parameters) | 1.89, 0.77, 0.46 | 4.31, 0.74, 0.51 | 4.10, 0.40, 0.58 | 0.34, 0.84, 0.48 |
| Filtrate 10 min, ml | — | 4.4 | — | 15 |

On comparing the formulation described in the present invention and the comparative fluid described in example #2, it can be seen that the former increases its viscosity at low shear values (reading at 6 and 3 rpm) and gel values after hot rolling at 90° C. for 16 hours. This indicates an improvement in the suspending and removal properties with the temperature, due to a complete hydration of the polymers present, whereas with the fluid of the comparative example, these properties deteriorate, indicating a deterioration in the fluid itself.

As far as the filtration characteristics are concerned, a lower volume of filtrate was determined for the fluid of example #1 with respect to that measured for the comparative fluid #2, containing $CaCO_3$ as solids for the formation of the filter cake. From this result, it can be deduced that the fluid #1, although not containing solids, has a greater tendency to form a more impermeable filter cake thus avoiding serious losses of filtrate in the formation. In addition, the formation of the filter cake obtained with fluid #1 is faster with respect to that obtained with the comparative formulation.

TABLE 2

Formation damage results

| Ex. | Fluid | Porous medium | T (° C.) | Ki (mD) | Kf (mD) | Kf/Ki % |
|---|---|---|---|---|---|---|
| #1 bis | #1 | limestone | 80 | 18.4 | 19.2 | 100 |
| #2 bis | #2 comp. | limestone | 80 | 38 | 25 | 66 |

From the core filtration data, it can be observed that the solid-free fluid in example #1 of the present invention does not cause any damage to the core and the return permeability Kf/Ki is complete (100%) within the measurement limits. On the contrary, the use of the fluid described in comparative example #2 (containing $CaCO_3$ as bridging solids) damages the core, even if only partially, with a return permeability of 66%.

What is claimed is:

1. A water-based drilling fluid comprising:
   (a) water,
   (b) at least one biopolymer which is a polysaccharide,
   (c) at least one filtrate reducer comprising (c1) a cross-linked starch selected from starches having different cross-linking degrees and (c2) cellulose microfibers,
   (d) optionally a hydrosoluble polymeric surface-active agent having an HLB ranging from 10 to 16.

2. The drilling fluid according to claim 1, characterized in that the biopolymer (b) is present in the drilling fluid in a concentration from 2 to 10 grams/liter; the cross-linked starch (c1) in a concentration from 10 to 30 grams/liter; and the cellulose microfibers (c2) in a quantity of 10 to 30 grams/liter.

3. The drilling fluid according to claim 2, characterized in that the biopolymer (b) is present in the drilling fluid in a concentration ranging from 4 to 7 grams/liter; the cross-linked starch (c1) in a concentration ranging from 12 to 20 grams/liter; and the cellulose microfibers (c2) in a concentration ranging from 12 to 20 grams/liter.

4. A process for drilling oil and/or gas wells by means of water-based drilling fluids, characterized in that the drilling fluid comprises:
   (a) water,
   (b) at least one biopolymer which is a polysaccharide,
   (c) at least one filtrate reducer comprising a cross-linked starch selected from starches having different cross-linking degrees and (c2) cellulose microfibers,
   (d) optionally a hydrosoluble polymeric surface-active agent having an HLB from 10 to 16.

5. The drilling fluid according to claim 1, wherein the optional component (d) has an HLB from 11 to 14.

6. The drilling fluid according to claim 1 wherein the biopolymer (b) is selected from the group consisting of non-ionic and ionic polysaccharide polymers.

7. The drilling fluid according to claim 1 wherein the biopolymer (b) is selected from the group consisting of scleroglucan, welan gum and xanthan gum.

8. The drilling fluid according to claim 7 wherein the filtrate reducer (c) comprises (c1) a starch cross-linked by a bifunctional reagent selected from the group consisting of phosphate and epichlorohydrin and (c2) a cross-linked colloidal cellulose fiber produced by an Acetobacter microorganism.

9. The drilling fluid according to claim 8, characterized in that the biopolymer (b) is present in the drilling fluid in a concentration from 2 to 10 grams/liter; the cross-linked starch (c1) in a concentration from 10 to 30 grams/liter; and the cellulose icrofibers (c2) in a quantity of 10 to 30 grams/liter.

10. The drilling fluid according to claim 9, characterized in that the biopolymer (b) is present in the drilling fluid in a concentration ranging from 4 to 7 grams/liter; the cross-linked starch (c1) in a concentration ranging from 12 to 20 grams/liter; and the cellulose microfibers (c2) in a concentration ranging from 12 to 20 grams/liter.

11. The process according to claim 4 wherein the biopolymer (b) is selected from the group consisting of scleroglucon, welan gum and xanthan gum.

12. The process according to claim 11 wherein the filtrate reducer (c) comprises (c1) a starch cross-linked by a bifunctional reagent selected from the group consisting of phosphates and epichlorohydrin and (c2) a cross-linked colloidal cellulose fiber produced by an Acetobacter micro organism.

13. The drilling fluid according to claim 12, characterized in that the biopolymer (b) is present in the drilling fluid in a concentration from 2 to 10 grams/liter; the cross-linked starch (c1) in a concentration from 10 to 30 grams/liter; and the cellulose microfibers (c2) in a quantity of 10 to 30 grams/liter.

14. The drilling fluid according to claim 13, characterized in that the biopolymer (b) is present in the drilling fluid in a concentration ranging from 4 to 7 grams/liter; the cross-linked starch (c1) in a concentration ranging from 12 to 20 grams/liter; and the cellulose microfibers (c2) in a concentration ranging from 12 to 20 grams/liter.

15. The process according to claim 4 wherein the optional component (d) has an HLB from 11 to 14.

16. The drilling fluid according to claim 10 wherein the biopolymer is scleroglucan.

17. The process according to claim 14 wherein the biopolymer is scleroglucan.

* * * * *

UNITED STATES PATENT AND TRADEMARK OFFICE
CERTIFICATE OF CORRECTION

PATENT NO.    : 6,495,493 B1                                            Page 1 of 1
DATED         : December 17, 2002
INVENTOR(S)   : Cobianco et al.

It is certified that error appears in the above-identified patent and that said Letters Patent is hereby corrected as shown below:

<u>Title page,</u>
Item [30], Foreign Application Priority Data, should read:
-- [30]   Foreign Application Priority Data
Nov. 26, 1999 .................................. MI99A002473 --

Item [75], Inventor should read:
-- [75]   Inventors:   Sandra Cobianco, Fara Gera D'Adda (IT); Martin Bartosek, Legnano (IT); Alberto Guarneri, Casalbuttano (IT) --

Item [73], Assignee should read:
-- [73] Assignees:   ENI S.p.A., Rome (IT); Enitecnologie S.p.A., San Donato Milanese (IT) --

Signed and Sealed this

Twentieth Day of May, 2003

JAMES E. ROGAN
*Director of the United States Patent and Trademark Office*